Sept. 3, 1935. F. W. BINNS 2,013,124
METHOD OF MAKING BASIC ZINC FORMALDEHYDE SULPHOXYLATE
Filed May 3, 1930
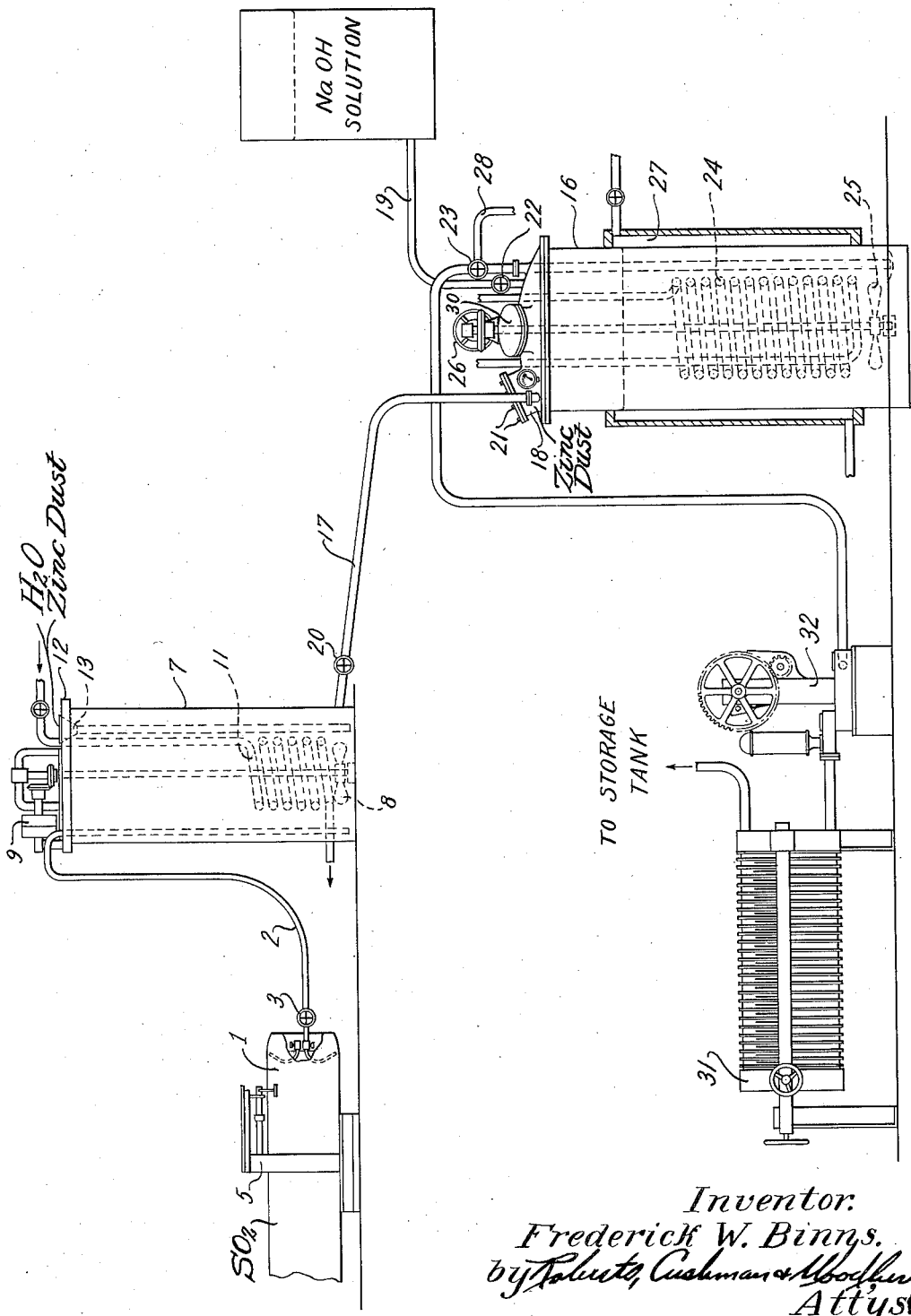
Inventor:
Frederick W. Binns.
by Roberts, Cushman & Woodbury
Attys Patented Sept. 3, 1935

2,013,124

UNITED STATES PATENT OFFICE 2,013,124

METHOD OF MAKING BASIC ZINC FORMALDEHYDE SULPHOXYLATE

Frederick W. Binns, Quincy, Mass., assignor to Virginia Smelting Company, Portland, Maine, a corporation of Maine Application May 3, 1930, Serial No. 449,461

5 Claims. (Cl. 260—141)

This invention relates to a method for the preparation of sodium formaldehyde sulphoxylate, often called "Rongalite" and/or basic zinc formaldehyde sulphoxylate which is frequently called "Insoluble Decroline".

Heretofore it has been common practice to prepare these reagents by effecting the chemical reaction between water, zinc dust, sodium bisulfite and formaldehyde or of water, zinc dust, sulfur dioxide and formaldehyde, respectively, in a single stage of operations and in an open vessel or at atmospheric pressure.

In order to effect the desired reactions, however, it is necessary to heat the reaction mixture to relatively high temperatures. Consequently, a large amount of the volatile reagents (usually of the formaldehyde which is required in excess for the progress of the reaction) is expelled and lost and a relatively large excess is thus consumed in order to obtain even approximate completion of the reaction.

While the amount and value of the formaldehyde thus lost is not ordinarily sufficient to warrant the installation and operation of recovery apparatus, it nevertheless constitutes an appreciable economic waste of materials and may also seriously pollute the atmosphere, making working conditions very disagreeable.

It is therefore an object of this invention to provide a method of making the above-mentioned products whereby the reactions may be substantially completed and the reagents effectively utilized, without appreciable loss of the formaldehyde or other reagents. It is also an object to avoid pollution of the atmosphere by the escape of disagreeable gases containing formaldehyde. Other objects will appear from the following disclosure.

In accordance with the present invention it is found to be highly advantageous to carry out the reactions in separate steps or stages comprising: First, preparing zinc formaldehyde sulphoxylate and zinc formaldehyde bisulfite as by the reaction of zinc and sulfur dioxide in the presence of formaldehyde and water which proceeds at normal temperatures, with evolution of heat; and, second, subjecting the reaction products to reduction either with zinc alone or with zinc and sodium hydroxide (or sodium carbonate, or both) in a closed vessel, at elevated pressure and temperature, until the reaction is substantially complete,—as indicated by withdrawing and testing samples, if necessary.

The first step may be carried out in an open vessel of any kind, the reactions being (in the presence of water) as follows:

[I] 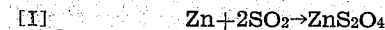 $Zn+2SO_2 \rightarrow ZnS_2O_4$

[II] 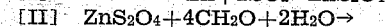 $ZnS_2O_4+4CH_2O+2H_2O \rightarrow$
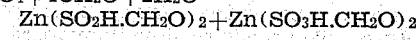 $Zn(SO_2H.CH_2O)_2+Zn(SO_3H.CH_2O)_2$ The resulting products may be retained completely in solution if sufficient water is employed, but more concentrated solutions are not detrimental and in fact are generally more efficient inasmuch as they avoid the subsequent removal or evaporation of a large volume of water. Accordingly, the reaction mixture may contain a relatively large proportion of the reaction products in solid condition which are preferably maintained in suspension as by agitating the charge continually during the operation.

The charge is then transferred to a vessel (which may be closed and subjected to pressure) and, for the preparation of sodium formaldehyde sulphoxylate, sodium hydroxide, in solution, and zinc dust are added. During such addition heat is evolved by the reaction and to prevent excessive rise of temperature the reactive mass is cooled. The vessel is closed (gas tight) and the charge subsequently heated under pressure, whereupon the following reactions take place.

[III] 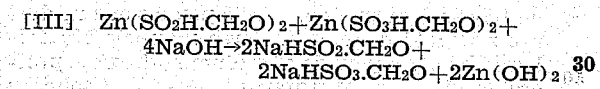 $Zn(SO_2H.CH_2O)_2+Zn(SO_3H.CH_2O)_2+$
$4NaOH \rightarrow 2NaHSO_2.CH_2O+$
$2NaHSO_3.CH_2O+2Zn(OH)_2$ and

[IV] 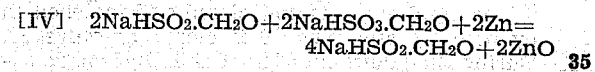 $2NaHSO_2.CH_2O+2NaHSO_3.CH_2O+2Zn=$
$4NaHSO_2.CH_2O+2ZnO$

For the preparation of basic zinc sulphoxylate formaldehyde the second stage of the reaction is carried out in a similar manner, but by the addition of zinc only, instead of zinc and sodium hydroxide, the reaction being:

[V] 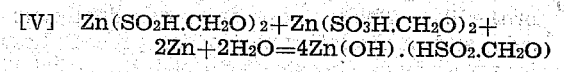 $Zn(SO_2H.CH_2O)_2+Zn(SO_3H.CH_2O)_2+$
$2Zn+2H_2O=4Zn(OH).(HSO_2.CH_2O)$ A representative example of effecting the process of the invention will be described, with reference to the accompanying drawing, in which the figure illustrates, diagrammatically, a side elevation of suitable apparatus for carrying out the process.

As shown in the drawing, liquid sulfur dioxide may be contained in tank 1 and drawn therefrom through pipe 2, controlled by valves 3. The tank may conveniently be supported upon a platform balance 5.

Pipe line 2 leads into the bottom of mixing tank 7, preferably below the agitator 8 (which is driven by pulley 9) and the cooling coil 11. Tank 7 may be covered at the top with a cover 12, which fits loosely leaving the contents at atmospheric pressure.

In operation, 269 lbs. of water is first run into the open mixing tank 7. The agitator 8 is then started and approximately 62 pounds of zinc dust are added slowly. When the suspension is uniformly dispersed, liquid sulfur dioxide, from supply tank 1, regulated by valve 3, is gradually introduced through pipe line 2 to the bottom of the mixing tank 7, to the extent of about 100 pounds. During this addition the reaction proceeds spontaneously, with evolution of heat,—so that cooling water should be circulated through coil 11 to maintain a temperature, preferably below 105° F., such that decomposition of the product shall not occur.

Following the addition of sulfur dioxide, formaldehyde or a formaldehyde solution (e. g. 129 pounds of an aqueous solution having a concentration of 37% formaldehyde by weight) may be added slowly through funnel 13 so that it enters well below the surface of the reaction mixture. The cooling coil is then operated to maintain the temperature not over 110° F. and the agitation kept up for approximately 30 minutes to insure complete reaction, as indicated by equations I and II, above.

The reaction mixture, which consists of a water solution of zinc formaldehyde sulphoxylate, zinc formaldehyde bisulfite and a slight amount of metallic zinc may be used immediately or stored for further use, as it is quite stable.

To carry out the second stage of the process, the reaction mixture may be introduced into a (closed) vessel such as the tank 16 in any convenient way, as by gravity, through a pipe 17, regulated by valve 20. The valve is then closed. The tank 16 is preferably larger than the mixing tank 7 and is suitably constructed and arranged to be hermetically closed and to withstand appreciable pressures. Its volume is preferably sufficient to receives the complete charge from tank 7, as well as the zinc dust and sodium hydroxide solution, and still leave a vapor space of approximately 25% at the top. 79.75 pounds of zinc dust are now added, (e. g. through manhole 18) followed by 64.75 pounds of sodium hydroxide, preferably dissolved in water, the resulting solution being introduced through pipe 19.

The manhole 18 is now closed and fastened as by bolts 21 and pipe 19 is closed by valve 22. During the addition of the sodium hydroxide solution, heat is evolved and the charge may be cooled as by passing cooling water through coil 24. The reaction mass is thoroughly agitated during the addition and reaction of the reagent materials by the agitator 25, operated by belt 26, or the like. The evolution of heat gradually subsides and in the latter part of the process, heat is applied by passing steam through the jacket 27 to raise the effective temperature of the mixture to about 185–190° F. As the temperature rises, escape valve 23 is closed and the accumulated gases above the reaction mixture develop an increased pressure which may amount to 25 pounds per square inch or more, but none of the gases is permitted to escape from the tank and consequently substantially complete reaction is effected. At the same time, excessive pressures (as for example in excess of the strength of the walls of the pressure chamber 16) may be prevented by suitable adjustment of the pressure relief valve 30.

After approximately two hours of heating and agitation in the closed vessel a sample may be withdrawn as from a sample pipe 28 and tested for its reducing value as by titrating with iodine or according to other known methods. The treatment is continued until successive test samples show no further increase in the reducing value of the product. This will usually require about three hours. Repeated tests will show when further heating no longer improves the product. During the heating, the zinc in suspension converts the sodium formaldehyde bisulfite into sodium formaldehyde sulphoxylate, the zinc being changed to zinc hydroxide and the entire mass becoming gradually lighter in color, due to the disappearance of the metallic zinc and its conversion to white zinc hydroxide. During the heating period, the alkalinity of the solution may also be tested. It is found that the alkalinity decreases during the heating and rises somewhat at the end of heating, but at no time should the solution be allowed to become neutral or acid.

The material may finally be discharged, by opening valve 23, and sent through a filter press 31, 31 by pump 32. The filter cake may then be washed in the filter press with water in the usual manner and the wash water may be conserved for use in making up new charges. The first filtrate is evaporated for the recovery of the sodium sulphoxylate formaldehyde as by evaporation and crystallization, while the wash water may be employed in the preparation of subsequent reaction mixtures.

For the preparation of basic zinc formaldehyde sulphoxylate the second stage of operations is conducted by adding the zinc dust only (i. e. omitting the sodium hydroxide solution) the remainder of the procedure being conducted substantially the same as described above. The resulting basic zinc sulphoxylate formaldehyde is insoluble in water, though soluble in acids or acid salt solutions. At the end of the reactions, the suspension is kept in agitation and discharged to the filter press. The filtrate should show practically no reaction with iodine. The filter cake is then dried and pulverized and constitutes the finished product.

Advantages of the procedure of the present invention are that by conducting that part of the operation which requires heat in a closed vessel under pressure, very little, if any, more than the theoretical amount of formaldehyde is required, whereas if the solution is heated in an open tank or at atmospheric pressure, a considerable excess of formaldehyde must be added and is lost. The atmosphere over the solution contains formaldehyde gas, methyl alcohol vapor, and sulfur dioxide, and it is believed that, by retaining this atmosphere in the reaction vessel and under pressure, not only is loss of formaldehyde and sulfur dioxide prevented but the reactions are thereby more completely effected. In any event, by employing a closed vessel, and keeping the reagents under pressure (approximately 25 pounds) it is found that less formaldehyde and less sulfur dioxide are used. Furthermore, by using two vessels instead of one, the maximum number of runs per day may be made in the more expensive closed pressure tank, while the preliminary steps are carried out in an open, inexpensive tank, which readily furnishes a constant supply of the intermediate reaction products for treatment in the pressure tank.

It is further found that the mixture, after reaction in the second tank and while still containing a slight excess of zinc, is relatively inert; but upon removing the zinc or zinc oxide in the filter press the solution acquires corrosive properties and upon coming into contact with copper or brass, slight changes take place in the solution, resulting in a discolored product upon evaporation. By employing equipment free from brass or copper, subsequent to the filtration stage, this difficulty is avoided.

I claim:

1. Method of making basic zinc formaldehyde sulphoxylate, which comprises the steps of treating zinc formaldehyde bisulphite with zinc dust in the presence of water, while cooling the reaction mass, and subsequently heating the same in a closed vessel, to complete the reaction.

2. Method of making basic zinc formaldehyde sulphoxylate, which comprises the steps of treating zinc formaldehyde bisulfite with zinc dust, in the presence of water, while cooling the reaction mass and subsequently heating the same, in a closed vessel, to develop a pressure of approximately 25 lbs. per square inch, to complete the reaction.

3. Method of making basic zinc formaldehyde sulphoxylate, which comprises the steps of treating zinc formaldehyde bisulfite with zinc dust, in the presence of water, while cooling the reaction mass and subsequently heating the same in a closed vessel to approximately 185°–190° F. to complete the reaction.

4. Method of making basic zinc formaldehyde sulphoxylate, which comprises the steps of treating zinc formaldehyde bisulfite with zinc dust, in the presence of water, in a closed vessel, removing the excess of free zinc and preserving the resulting solution from decomposition thereafter by preventing contact of the resulting solution with copper.

5. Method of making basic zinc formaldehyde sulphoxylate, which comprises the steps of treating zinc formaldehyde bisulfite with zinc dust, in the presence of water, cooling the reaction mass and subsequently heating the same to complete the reaction at increased pressure and at a temperature approximating the boiling point of water, and continuing the same until the reaction mixture shows no further increase in reducing value.

FREDERICK W. BINNS.